US008326302B2

(12) United States Patent
Julka

(10) Patent No.: US 8,326,302 B2
(45) Date of Patent: Dec. 4, 2012

(54) SYSTEM AND METHOD FOR INITIAL GATEWAY SELECTION

(75) Inventor: Vibhor Julka, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 328 days.

(21) Appl. No.: 12/721,091

(22) Filed: Mar. 10, 2010

(65) Prior Publication Data

US 2010/0234025 A1    Sep. 16, 2010

Related U.S. Application Data

(60) Provisional application No. 61/159,355, filed on Mar. 11, 2009.

(51) Int. Cl.
*H04W 36/00* (2009.01)
(52) U.S. Cl. ............... 455/436; 455/442; 455/435.1; 455/435.2; 455/432.1; 370/331
(58) Field of Classification Search ............ 455/436, 455/442, 435.1, 435.2, 432.1; 370/331
See application file for complete search history.

(56) References Cited

U.S. PATENT DOCUMENTS

| | | | |
|---|---|---|---|
| 5,752,162 A * | 5/1998 | Sawyer et al. | 455/13.1 |
| 6,711,159 B1 | 3/2004 | Grabelsky et al. | |
| 7,921,458 B2 * | 4/2011 | Hara et al. | 726/15 |

FOREIGN PATENT DOCUMENTS

| | | |
|---|---|---|
| CN | 1859285 A | 11/2006 |
| CN | 101227748 A | 7/2008 |
| WO | WO 2007/059668 A1 | 5/2007 |

OTHER PUBLICATIONS

PCT International Search Report, International Application No. PCT/CN2010/070989, Huawei Technologies Co. Ltd. et al., Jun. 17, 2010, 11 pages.

* cited by examiner

*Primary Examiner* — Nghi H Ly
(74) *Attorney, Agent, or Firm* — Slater & Matsil, L.L.P.

(57) ABSTRACT

A system and method for selecting a gateway upon mobile station initial network entry is provided. A method for controller operations includes determining that a criterion for gateway selection for a mobile station is met, selecting a gateway based on an allocation vector, and transmitting an allocation request to the selected gateway. The selecting being based on an allocation vector of selection probabilities for a plurality of gateways. The method also includes receiving a response message from the selected gateway, completing an initial network entry procedure if the response message indicates that the selected gateway will support the mobile station, and performing an alternate selection procedure if the response message indicates that the selected gateway will not support the mobile station.

25 Claims, 4 Drawing Sheets

SYSTEM AND METHOD FOR INITIAL GATEWAY SELECTION

This application claims the benefit of U.S. Provisional Application No. 61/159,355, filed on Mar. 11, 2009, entitled "System and Method for Initial Gateway Selection," which application is hereby incorporated herein by reference.

TECHNICAL FIELD

The present invention relates generally to wireless communications, and more particularly to a system and method for selecting a gateway upon mobile station initial network entry.

BACKGROUND

In flexible network architectures, such as a "R6-Flex" architecture proposed by the WiMAX Forum Network Working Group (NWG), all base stations (BSs) can connect to all gateways (GWs) within a given cluster. Flex network architectures are also supported in other technologies, such as those supported by the Third Generation Partnership Project (3GPP) and the Third Generation Partnership Project 2 (3GPP2).

A problem that may arise with flexible network architectures is that when a mobile station (MS) initially enters the network, its serving BS must select an access service network-gateway (ASN-GW) for the MS. Since the serving BS is connected to all ASN-GWs within the cluster, the BS may have trouble selecting an appropriate ASN-GW. For example, an ASN-GW selected by the BS may be too busy to service the MS, or the ASN-GW may not wish to service the MS, due to having to meet equal or fair utilization of ASN-GWs in the cluster.

SUMMARY OF THE INVENTION

These and other problems are generally solved or circumvented, and technical advantages are generally achieved, by embodiments of a system and method for selecting a gateway upon mobile station initial network entry.

In accordance with an embodiment, a method for controller operations is provided. The method includes determining that a criterion for gateway selection for a mobile station is met, selecting a gateway based on an allocation vector, and transmitting an allocation request to the selected gateway. The selecting is based on an allocation vector of selection probabilities for a plurality of gateways. The method also includes receiving a response message from the selected gateway, completing an initial network entry procedure if the response message indicates that the selected gateway will support the mobile station, and performing an alternate selection procedure if the response message indicates that the selected gateway will not support the mobile station.

In accordance with another embodiment, a method for gateway operations is provided. The method includes coordinating with other gateways in a plurality of gateways, receiving an allocation request for a mobile station from a base station, and determining if the gateway will accept the allocation request for the mobile station. The determining is based on information shared with the other gateways. The method also includes transmitting a first response message to the base station if the gateway will accept the allocation request for the mobile station. The first response message indicates that the gateway will accept the allocation request for the mobile station. The method further includes transmitting a second response message to the base station if the gateway will not accept the allocation request for the mobile station. The second response message indicates an error.

In accordance with another embodiment, a method for gateway operations is provided. The method includes coordinating with other gateways in a plurality of gateways, receiving an allocation request for a mobile station from a base station, and determining if the gateway will accept the allocation request for the mobile station. The determining is based on information shared with the other gateways. The method also includes transmitting a first response message to the base station if the gateway will accept the allocation request for the mobile station. The first response message indicates that the gateway will accept the allocation request for the mobile station. The method further includes selecting an alternate gateway, and transmitting an alternate allocation request for the mobile station to the alternate gateway if the gateway will not accept the allocation request for the mobile station.

In accordance with another embodiment, a communications controller is provided. The communications controller includes a receiver, an initial/network entry unit coupled to the receiver, and a controller coupled to the receiver. The receiver receives requests for initial network entry from a mobile station and response messages, and the controller selects a gateway for the mobile station, selects an alternate gateway for the mobile station, and configures an allocation vector for use in selecting the gateway. The initial/network entry unit determines if the mobile station is performing an initial registration or already has an assigned gateway.

An advantage of an embodiment is that a hybrid technique (a combination of centralized and distributed techniques) for selecting ASN-GWs is provided. Therefore, a wide degree of flexibility is provided in a trade-off with coordination and messaging overhead.

A further advantage of an embodiment is that a wide range of ASN-GW selection criteria may be used, including load balancing, to distribute MSs among ASN-GWs.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a WiMAX compliant communications system supporting a flexible network architecture. The invention may also be applied, however, to other communications systems, such as those compliant with the Third Generation Partnership Project (3GPP) technical standards supporting an Iu-flex architecture, wideband code division multiple access (WCDMA), and so on.

Figure 1:
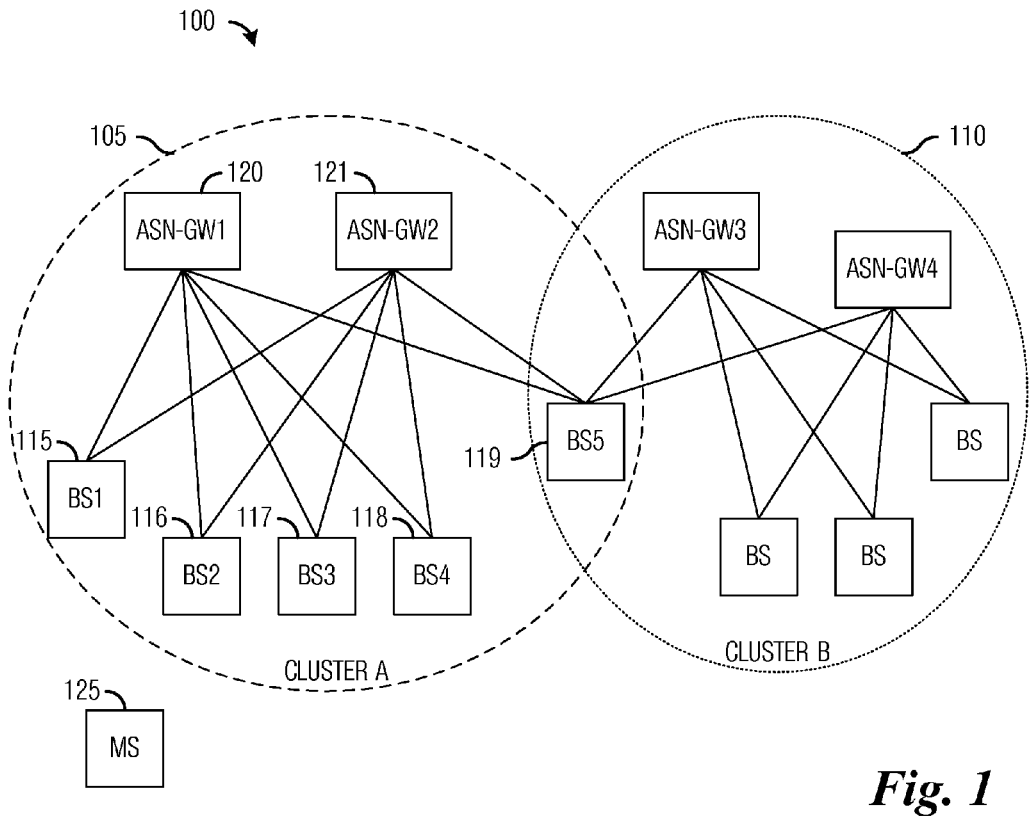
FIG. 1 is a diagram of a portion of a communications network.

FIG. 1 illustrates a portion of a communications network 100. Communications network 100 includes two clusters, cluster A 105 and cluster B 110. Cluster A 105 includes a number of base stations (BSs), including BS1 115, BS2 116, BS3 117, BS4 118, and BS5 119, which have connections to all access service network-gateways (ASN-GWs), including ASN-GW1 120 and ASN-GW2 121, within cluster A 105. Similarly, cluster B 110 includes a number of BSs and ASN-GWs. A BS may be a member of both clusters, for example, BS5 119 belongs to both cluster A 105 and cluster B 110.

The specification of a cluster (i.e., which ASN-GW and BS belong to a cluster) is based on vendor/operator network planning An impact of this architecture is that a BS must decide, upon mobile station (MS), such as MS 125, initial network entry, which ASN-GW to which the MS will connect. In addition to an initial network entry, the BS may need to select an ASN-GW for a MS if the MS participates in an inter-cluster handoff (HO) and the communications system has not selected an ASN-GW for the MS. In a non-flexible network architecture, wherein a BS typically connects to only one ASN-GW, there is no need for a selection of an ASN-GW to which the MS will connect.

As part of an inter-cluster handoff, a current ASN-GW serving the MS may recognize that it is not connected to a new BS (a target BS of the inter-cluster handoff) and may perform a paging controller relocation to a new ASN-GW. The identity of a new paging controller may be provided to and may be used by the MS to inform the new BS which ASN-GW the MS should connect to as it performs mobility events in a new cluster (the cluster containing the new BS). Alternatively, upon handoff to a new cluster, if the communications system does not perform paging controller relocation, the BS may perform an ASN-GW selection to select a new ASN-GW for the MS. The new ASN-GW may be able to communicate with the MS's old ASN-GW to retrieve existing information associated with the MS.

Once the ASN-GW has been selected for the MS, there is usually no need for re-selection at subsequent re-entry from idle mode (either at the same BS or at a different BS) since the MS will include a paging controller identifier as part of a re-entry message. In the context of the R6-Flex architecture, the paging controller is always located at the initially selected ASN-GW. In the case of re-entry at a different BS due to an active handoff, the identity of the initially selected ASN-GW is passed as an attribute in handover signaling exchanged between source and target BSs.

A first characterization of a solution for ASN-GW selection may be its nature, i.e., centralized or distributed behavior. Both centralized and distributed algorithms may be developed to address initial selection problems. In a purely centralized approach, a central entity (such as a dedicated ASN-GW) is responsible for always redirecting the BS request to the initially selected ASN-GW to which a connection may be established. Such an approach requires the centralized entity to have the necessary information (e.g., ASN-GW utilization/resource capacity for the different ASN-GWs within the cluster, network topology, etc.) to make the selection. In addition, with the purely centralized approach there may be increased R6 messaging and overall latency in that, at every selection instance, the BS must initially go to a central entity (requiring signaling and one round trip) to determine which ASN-GW to connect to followed by additional signaling (incurring a second round trip) for the BS to request connection to the specified ASN-GW. While, in a fully distributed approach the BS is responsible for selection of the ASN-GW.

A second characterization of the solution is what state information is made available to the entity making the selection. In the centralized approach, it may be assumed that a decision making entity has the necessary information (obtained through signaling with the ASN-GWs, for example) such as current resource utilization for all the ASN-GWs in the cluster to select the optimal ASN-GW so as to achieve some desired system performance (e.g., load balancing across all ASN-GWs). The signaling between the ASN-GW and the centralized decision making entity represents an overhead associated with the algorithm. In the case of a distributed BS approach, each BS would have to either periodically solicit this information from the ASN-GWs or the ASN-GWs would periodically send this information to the BS. Assuming that there is a cluster with N ASN-GWs and M BSs, where N and M are integer values greater than one, it is straightforward to show that with a centralized solution, O(N) messages are needed, whereas in the distributed approach O(NM) messages are needed, where O0 represents an order function. Typically M>>N so that the overhead may be much greater in the case of a distributed solution. Regardless, either approach using ASN-GW state information entails signaling overhead.

Figure 2:
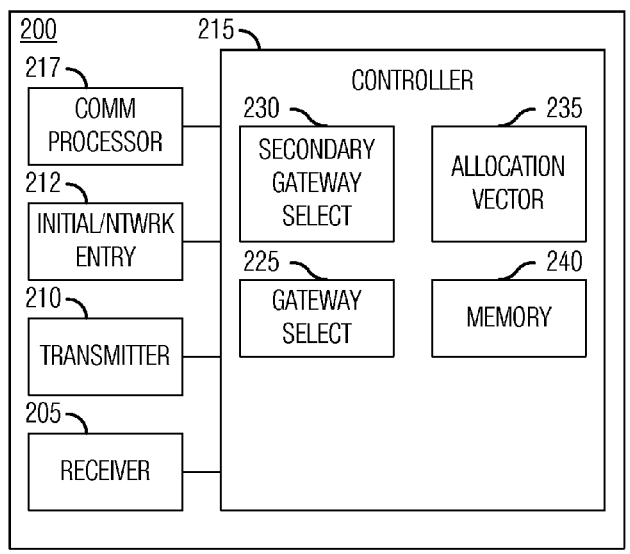
FIG. 2 is a diagram of a base station.

FIG. 2 illustrates a BS 200. BS 200 may be a typical BS operating in a communications system, such as a WiMAX compliant communications system. BS 200 may include a receiver 205 and a transmitter 210. Receiver 205 may be used to receive transmitted signals, while transmitter 210 may be used to transmit signals. For example, receiver 205 may receive transmissions from a MS as the MS performs initial network entry procedures. As shown previously, BS 200 may be connected to several ASN-GWs in its cluster. BS 200 may communicate with the ASN-GWs through wired or wireless backhaul links via receiver 205 and transmitter 210.

BS 200 also includes an initial/network entry unit 212. Initial/network entry unit 212 may be used to determine if the MS is performing an initial MS registration (i.e., performing an initial network entry) or if the MS already has an assigned ASN-GW. Furthermore, initial/network entry unit 212 may be used to perform the processes necessary for network entry for the MS, which may include MS authentication and authorization, MS binding, initial channel, and so forth. If the MS already has an assigned ASN-GW, then BS 200 may use an associated ASN-GW identifier to connect the MS to the assigned ASN-GW.

If the MS has not previously joined the communications system, BS 200 may select an ASN-GW for the MS. A controller 215 in BS 200 may initiate and control the ASN-GW selection process for the MS. Controller 215 may include a gateway select unit 225 and a secondary gateway select unit 230 to help perform the ASN-GW selection process. Gateway select unit 225 may be used to select an ASN-GW for the MS. The selection of an ASN-GW for the MS may be based on a number of factors, including load balancing, network traffic, allocation history, usage history, and so on. Secondary gateway select unit 230 may be used to select a secondary ASN-GW in case that the ASN-GW selected by gateway select unit 230 rejects the MS and does not provide an alternative ASN-GW. Operation of gateway select unit 225 and secondary gateway select unit 230 is provided in detail below.

A communications processor 217 coupled to controller 215 and may be responsible for performing communications with the selected ASN-GW, secondary ASN-GW, and so forth. For example, gateway select unit 225 or secondary gateway select unit 230 may provide an ASN-GW selection to communications processor 217 and communications processor 217 may establish communications with the ASN-GW.

Controller 215 may also include an allocation vector unit 235 that may be used to generate a selection vector that may be used by gateway select unit 225 to select an ASN-GW for the MS. Allocation vector unit 235 may consider the factors discussed above, such as load balancing, network traffic, allocation history, usage history, and so forth, as it generates the selection vector. A detailed description of allocation vector unit 235 is provided below. A memory 240 may be used to store the selection vector, as well as other information, such as previous ASN-GW selections, selection results, and so forth.

According to an embodiment, a hybrid algorithm is proposed, wherein the BS may be primarily responsible for the ASN-GW selection; however the ASN-GW has the ability to reject an attachment request resulting in the BS making an alternate selection or redirecting the BS to an alternate ASN-GW. The redirection can be supported in one of two ways, both of which are described below. The embodiments may not require state information (e.g., ASN-GW utilization) to be shared between the BS and the ASN-GWs.

As described below, the embodiments for an initial ASN-GW selection algorithm for a cluster comprising N ASN-GWs are described in detail, where N is a number of ASN-GWs in a single cluster if a BS is a member of a single cluster or N is a number of ASN-GWs in multiple clusters if the BS is a member of multiple clusters. For example, referencing FIG. 1, for a BS other than BS 119 in cluster 105, N may be equal to two, while for BS 119, N may be equal to four. The embodiments are presented in terms of processing to be performed at a BS and the ASN-GW. Finally, the embodiments are specified in terms of messaging and procedures to be executed for a WiMAX compliant communications system, that is, referenced to 802.16 messages (e.g., RNG-REQ) and WiMAX NWG messages (e.g., R6 MS_PreAttachment_Req/Rsp) however, as noted earlier, the concepts can be readily generalized so to be applicable to other access technologies (such as WCDMA). In general, the embodiments may be applicable to network architectures (both wired and wireless) where a node in the network may be required to select from one of N different peer nodes that it can connect to and meet desired performance requirements/criteria.

Figure 3:
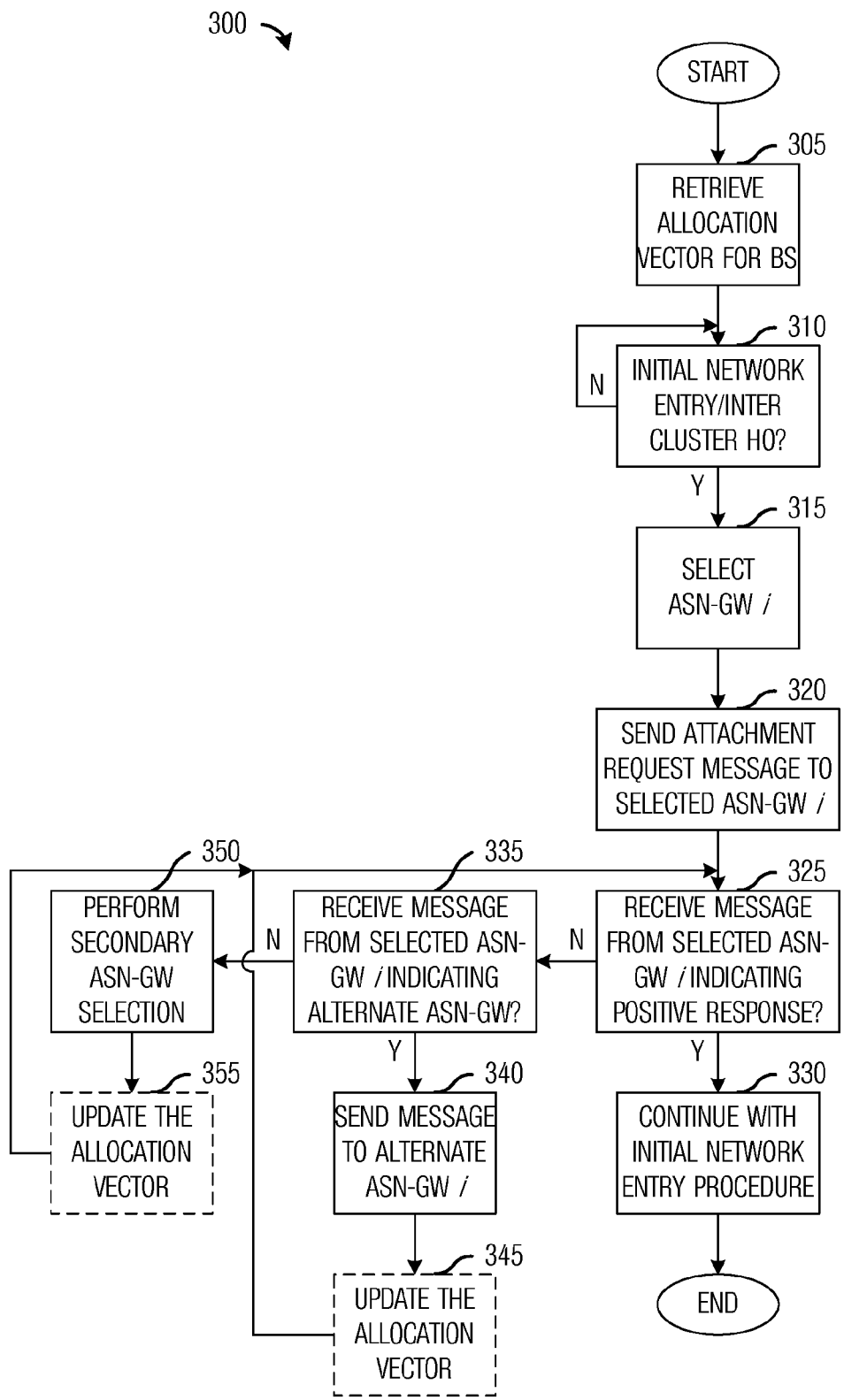
FIG. 3 is a flow diagram for base station operation.

FIG. 3 illustrates a flow diagram for BS operations 300 for initial network entry by a MS. BS operations 300 may be indicative of operations occurring in a BS, such as BS 200, as the BS responds to an initial network entry by a MS. BS operations 300 relate to an initial selection of an ASN-GW by the BS as the MS enters a communications system. BS operations 300 may execute whenever a MS enters the communications system. Additionally, BS operations 300 may execute when a MS performs an inter-cluster handoff and the communications system has not assigned a new ASN-GW to the MS. BS operations 300 do not require state information such as ASN-GW utilization to be exchanged between the BS and the ASN-GWs, reducing signaling overhead associated with the embodiments.

BS operation 300 may begin with the BS retrieving an allocation vector $\Omega_N = [\phi_1 \ldots \phi_N]$, where $\phi_i$ with $i=1\ldots N$ is the probability associated with a biased N-sided coin (i.e., is the probability that the BS will select ASN-GW i) (block 305). Each BS in the communications system may retrieve its own allocation vector $\Omega_N$, from memory, for example. According to an embodiment, the BS may generate its allocation vector upon initial startup. According to another embodiment, instead of generating its own allocation vector $\Omega_N$, the allocation vector may already be preconfigured for the BS. Additionally, the allocation vector may be modified by the BS in previous iterations of BS operations 300 based on events such as a rejection or redirection. For example, an operator of the communications system may have preconfigured the allocation vector. The BS may also maintain a static mapping between each outcome of the coin and a unique ASN-GW address. The BS may also be provisioned with 1 or more (potentially up to N–1) re-selection probability vectors. The re-selection probability vectors may be used by the BS to re-select an ASN-GW for the MS in case the selected ASN-GW rejects the MS. The re-selection probability vectors may or may not be based on the allocation vector for the BS.

The initial specification of $\Omega_N$ may allow for static (e.g., always selecting a specific ASN-GW i may be supported by setting $\phi_i=1$), pure random selection (all ASN-GW have equal probability of selection $\phi_i=1/N$), or biased (unequal allocation of probabilities) selection algorithms. The selection of $\Omega_N$ may also be dependent on desired system performance to be supported by the embodiments. For example, to support long term load balancing across all ASN-GWs, the probabilities should be set $\phi_i=1/N$ (assuming uniform traffic at each BS). Alternatively, in trying to minimize latency on the backhaul, a static policy based on network topology can be used with $\phi_i=1$ depending on which ASN-GW i has the shortest distance metric to the BS. Regardless, the initial allocation of probabilities for $\Omega_N=[\phi_1 \ldots \phi_N]$ may be vendor and/or operator specific values.

The BS may then wait for an initial network entry of a MS or that the MS is participating in an inter-cluster handoff and the communications system has not assigned a new ASN-GW for the MS (block 310). For example, the BS may receive a RNG-REQ from a MS, indicating initial network entry or if the BS determines that the MS is participating in an inter-cluster handoff and the communications system has not assigned a new ASN-GW to the MS, for example, the BS will toss the N-sided coin and select an ASN-GW i associated with the result of the N-sided coin toss (block 315). The BS will send an attachment request (e.g., a R6 MS_PreAttachment_Req message) to the selected ASN-GW i (block 320). The BS may wait until it receives a response to the attachment request (e.g., a R6 MS_PreAttachment_Rsp message) from the selected ASN-GW i indicating that the selected ASN-GW i can support the MS (block 325). If the BS receives such a message, the BS may then continue with an initial network entry procedure (block 330) and BS operations 300 may then terminate.

However, the BS may receive a R6 MS_PreAttachment_Rsp message containing a negative response (block 335). The BS may perform a check to determine if the R6 MS_PreAttachment_Rsp message contains an alternate ASN-GW (block 335). If the BS receives such a message, the BS may send a R6 MS_PreAttachment_Req message to the alternate ASN-GW (block 340). Optionally, the BS may update $\Omega_N$ to reflect redirection (block 345).

Updating $\Omega_N$ may be dynamic in nature. The embodiments allow for the BS to dynamically update the selection probabilities based on feedback received from the ASN-GW. That is, the BS can update $\Omega_N$ based on events such as redirection or rejection (as discussed below). In particular, based on the error code received in a R6 MS_PreAttachment_Rsp message, the BS can adjust the selection probabilities so as to decrease the likelihood of selecting that same ASN-GW in the future. The algorithms by which $\Omega_N$ is updated may be vendor specific. The following illustrates one such example; based on receipt of a R6 MS_PreAttachment_Rsp message containing an error code indicating that the ASN-GW is unable to process additional requests (e.g. the ASN-GW could be in an overload condition) for a duration T seconds. The duration T seconds may or may not be included in the response from the ASN-GW. For example, the duration T may be configured at the BS, provided by an operator of the communications system, or so forth. Furthermore, if the ASN-GW recovers earlier than expected, the duration T may be rescinded. The BS may update $\Omega_N$ as follows:

$$\phi_i = 0$$

$$\phi_j = \phi_j + (\phi_j / \Sigma_{k \neq i} \phi_k) \phi_i \quad (1)$$

The BS may then use the updated probabilities in equation (1) for subsequent initial selections for a duration of T seconds. After this time, the BS will revert back to the initial configured $\Omega_N$.

The BS may then return to block 325 to wait for a R6 MS_PreAttachment_Rsp message from the alternate ASN-GW responding to the R6 MS_PreAttachment_Rsp message sent in block 340 regarding its ability to support the MS.

If the BS does not receive a R6 MS_PreAttachment_Rsp message containing an alternate ASN-GW (e.g., the BS may receive a R6 MS_PreAttachment_Rsp message containing an error code or no response at all), then the BS may perform a secondary ASN-GW selection (block 350) and the BS may return to block 325 to wait for a R6 MS_PreAttachment_Rsp message indicating that the secondary ASN-GW can support the MS. Optionally, the BS may update $\Omega_N$ to reflect rejection (block 355) prior to returning to block 325.

In performing the secondary ASN-GW selection, the BS uses an $r^{th}$ re-selection probability vector $\pi^{(r)}{}_N = [\rho^r_1 \ldots \rho^r_N]$ where $\rho^r_i$ is the probability that the BS will select ASN-GW i on the $r^{th}$ re-selection attempt. The re-selection vectors can be either pre-configured at the BS or can be derived as follows:

$$\rho^{(1)}_i = 0$$

$$\rho^{(1)}_j = \phi_j + (\phi_j / \Sigma_{k \neq i} \phi_k) \phi_i \quad (2)$$

and $$\rho^{(n)}_i = 0$$

$$\rho^{(n)}_j = \rho^{(n-1)}_j + (\rho^{(n-1)}_j / \Sigma_{k \neq i} \rho^{(n-1)}_k) \rho^{(n-1)}_i \quad (3)$$

where i refers to the index of the ASN-GW from which the rejection was received. Equation (2) is used to generate the first re-selection probability vector $\Pi^{(1)}{}_N$ and is generated from $\Omega_N$ whereas equation (3) is used to generate subsequent re-selection vectors. In each operation, the above equations reassign the probability associated with the ASN-GW i to the remaining ASN-GWs proportional to the previous selection weighting. Upon re-selection of an ASN-GW, the BS may send an R6 MS_PreAttachment_Req message to the new selected ASN-GW.

Figure 4A:
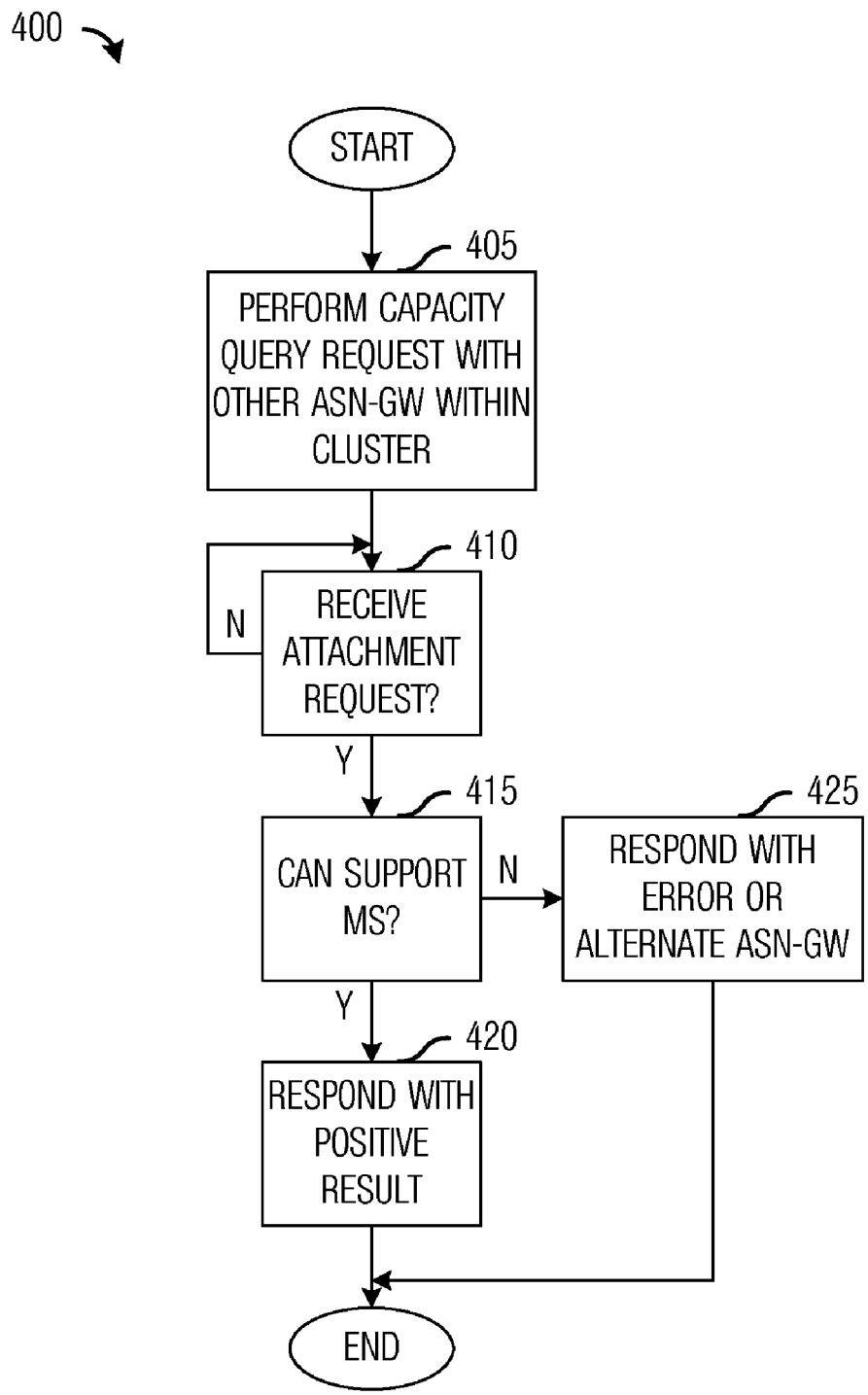
FIG. 4a is a flow diagram for first access service network-gateway (ASN-GW) operation.

FIG. 4a illustrates a flow diagram for ASN-GW operations 400. ASN-GW operations 400 may be indicative of operations occurring in an ASN-GW to the initial selection of the ASN-GW by a BS as a MS enters a communications system. ASN-GW operations 400 may execute whenever an attempt is made to select an ASN-GW by a BS. ASN-GW operations 400 do not require state information such as ASN-GW utilization to be exchanged between the BS and the ASN-GWs, reducing signaling overhead associated with the embodiments.

ASN-GW operations 400 may begin with ASN-GWs within a cluster performing query report/request procedures (block 405). The query report/request procedures may be executed to help assist in a re-direction procedure. For example, the ASN-GWs within the cluster may share information such as load, usage history, and so forth, which may be helpful in load balancing the ASN-GWs. The query report/request procedures may be executed periodically in order to provide an accurate picture of a utilization of the ASN-GWs. If secondary or alternate ASN-GW selection is not required by the ASN-GW, query report/request procedures may not be necessary.

The ASN-GW may check to determine if it has received an attachment request (e.g., a R6 MS_PreAttachment_Req message) transmitted by BS operating for a MS that is just entering the communications network (block 410). If the ASN-GW has not received an attachment request, the ASN-GW may return to block 410 to wait until it does receive an attachment request. Alternatively, the ASN-GW may have an interrupt that is asserted once an attachment request is received.

When the ASN-GW does receive an attachment request, the ASN-GW may check to determine if it can support the MS (block 415). For example, the ASN-GW may check to determine if it has adequate bandwidth available to support the requirements of the MS, are the wait times of MSs that it is already supporting meeting requirements, has it exceeded a maximum allowable number of MSs, and so forth. If the ASN-GW can support the MS, then the ASN-GW may respond to the attachment request with a response message (e.g., a R6 MS_PreAttachment_Rsp message) with a positive result, indicating that indeed it can support the MS (block 420).

If the ASN-GW cannot support the MS, then the ASN-GW may respond to the attachment request with a response message (e.g., a R6 MS_PreAttachment_Rsp message) with an error code indicating that it cannot support the MS (block 425). Additionally, the R6 MS_PreAttachment_Rsp message may include an alternate ASN-GW that the BS should redirect the attachment request, wherein the alternate ASN-GW may be selected based on information exchanged with other ASN-GWs as part of the query report/response procedure. After the ASN-GW transmits the R6 MS_PreAttachment_Rsp message with either the positive result or the error code, the ASN-GW operations 400 may terminate.

Figure 4B:
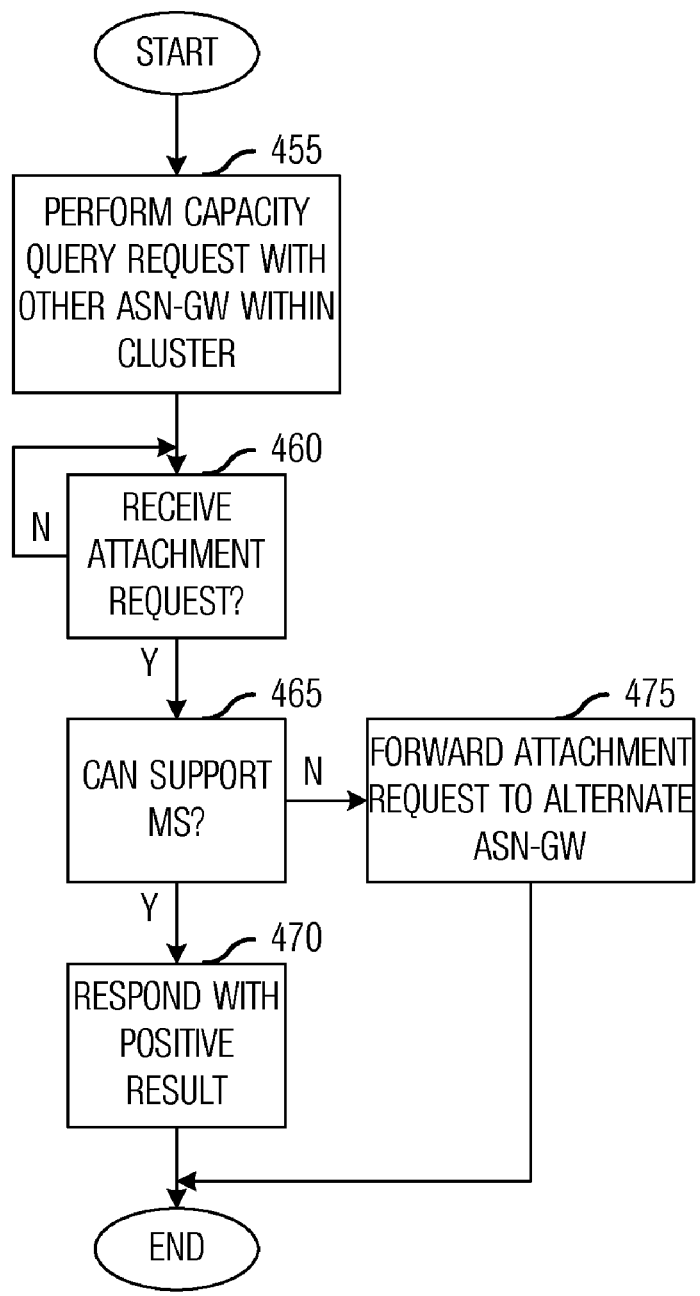
FIG. 4b is a flow diagram for second ASN-GW operation.

FIG. 4b illustrates a flow diagram for ASN-GW operations 450. ASN-GW operations 450 may be indicative of operations occurring in an ASN-GW to the initial selection of the ASN-GW by a BS as a MS enters a communications system. ASN-GW operations 450 may execute whenever an attempt is made to select an ASN-GW by a BS. ASN-GW operations 450 do not require state information such as ASN-GW utilization to be exchanged between the BS and the ASN-GWs, reducing signaling overhead associated with the embodiments.

ASN-GW operation 450 may begin with ASN-GWs within a cluster performing query report/request procedures (block 455). The query report/request procedures may be executed to help assist in a re-direction procedure. For example, the ASN-GWs within the cluster may share information such as load, usage history, and so forth, which may be helpful in load balancing the ASN-GWs. The query report/request procedures may be executed periodically in order to provide an accurate picture of a utilization of the ASN-GWs. If secondary or alternate ASN-GWs are not required by the ASN-GW, query report/request procedures may not be necessary.

The ASN-GW may check to determine if it has received an attachment request (e.g., a R6 MS_PreAttachment_Req message) transmitted by BS operating for a MS that is just entering the communications network (block 460). If the ASN-GW has not received an attachment request, the ASN-GW may return to block 460 to wait until it does receive an attachment request. Alternatively, the ASN-GW may have an interrupt that is asserted once an attachment request is received.

When the ASN-GW does receive an attachment request, the ASN-GW may check to determine if it can support the MS (block 465). For example, the ASN-GW may check to determine if it has adequate bandwidth available to support the requirements of the MS, are the wait times of MSs that it is already supporting meeting requirements, has it exceeded a maximum allowable number of MSs, and so forth. If the ASN-GW can support the MS, then the ASN-GW may respond to the attachment request with a response message (e.g., a R6 MS_PreAttachment_Rsp message) with a positive result, indicating that indeed it can support the MS (block 470).

If the ASN-GW cannot support the MS, then the ASN-GW may respond to the attachment request with a re-direct request message (e.g., a R4 Re-direction Request message) sent to an alternate ASN-GW selected for supporting the MS (block 475). The alternate ASN-GW may be selected based on information exchanged with other ASN-GWs as part of the query report/response procedure. The alternate ASN-GW will respond back to the BS with a response message (a R6 MS_PreAttachment_Rsp message) indicating a positive result. The ASN-GW operations 450 may terminate after the ASN-GW responds with a response message (e.g., a R6 MS_PreAttachment_Rsp message) with a positive result (block 470) or transmits a re-direct request message (e.g., a R4 Re-direction Request message) sent to an alternate ASN-GW (block 475).

The embodiments provide a framework where the ASN-GWs can communicate with peer gateways in the cluster to perform dynamic load balancing and re-direct the BS to a preferred ASN-GW. The redirection can be supported in one of two ways. In the first option (FIG. 4*a*), the initially selected ASN-GW responds to the BS with a reject message containing the alternate ASN-GW to connect to. In the second option (FIG. 4*b*), the initially selected ASN-GW forwards the request from the BS to the alternate ASN-GW which responds back to the BS with an accept message. The second option may have an advantage in reducing the R6 signaling and overall latency. Support for redirection by the ASN-GW is an optional procedure. Furthermore, the embodiments provide for a reselection procedure in case that redirection is not supported.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operations, the method comprising:
   determining that a criterion for gateway selection for a mobile station is met;
   selecting, by a base station, a gateway for the mobile station in accordance with an allocation vector of selection probabilities for a plurality of gateways, wherein the base station is an intermediary between the mobile station and the gateway;
   transmitting an allocation request to the selected gateway;
   receiving a response message from the selected gateway;
   completing an initial network entry procedure for the mobile station if the response message indicates that the selected gateway will support the mobile station; and
   performing an alternate selection procedure if the response message indicates that the selected gateway will not support the mobile station.

2. The method of claim 1, wherein determining that a criterion for gateway selection for a mobile station is met comprises:
   receiving a request for initial network entry by the mobile station; or
   detecting that the mobile station is participating in an inter-cluster handoff and that a gateway has not been assigned to the mobile station.

3. The method of claim 1, further comprising determining the allocation vector.

4. The method of claim 3, wherein determining the allocation vector comprises selecting a selection probability for each gateway in the plurality of gateways.

5. The method of claim 3, wherein determining the allocation vector further comprises configuring up to N-1 re-selection probability vectors, where N is a number of gateways in the plurality of gateways.

6. The method of claim 1, wherein selecting a gateway comprises:
   generating a random number; and
   selecting the gateway from the plurality of gateways as the selected gateway based on the allocation vector and the random number.

7. The method of claim 1, wherein the response message comprises an indicator of an alternate gateway, and wherein performing an alternate selection procedure comprises:
   transmitting an alternate allocation request to the alternate gateway;
   receiving an alternate response message from the alternate gateway; and
   completing the initial network entry procedure for the mobile station if the alternate response message indicates that the alternate gateway will support the mobile station.

8. The method of claim 1, wherein performing an alternate selection procedure comprises:
   selecting an alternate gateway based on a first re-selection probability vector;
   transmitting an alternate allocation request to the alternate gateway;
   receiving a response message from the alternate gateway; and completing the initial network entry procedure for the mobile station if the response message indicates that the alternate gateway will support the mobile station.

9. The method of claim 8, further comprising repeating the selecting an alternate gateway, the transmitting an alternate allocation request, the receiving a response message from the alternate gateway, and the completing the initial network entry procedure if the response message indicates that the alternate gateway will support the mobile station, for a second re-selection probability vector if the response message indicates that the alternate gateway will not support the mobile station.

10. A method for controller operations, the method comprising:
   determining that a criterion for gateway selection for a mobile station is met;
   determining an allocation vector of selection probabilities for a plurality of gateways, wherein determining the allocation vector comprises configuring up to N-1 re-selection probability vectors, where N is a number of gateways in the plurality of gateways, wherein an r-th re-selection probability vector is expressible as $\Pi^{(r)}{}_N = [\rho^r_1 \ldots \rho^r_N]$, where $\rho^r_i$ is a probability that ASN-GW i is selected on an r-th re-selection attempt;
   selecting a gateway for the mobile station, wherein the selecting is based on the allocation vector;
   transmitting an allocation request to the selected gateway;
   receiving a response message from the selected gateway;
   completing an initial network entry procedure for the mobile station if the response message indicates that the selected gateway will support the mobile station; and
   performing an alternate selection procedure if the response message indicates that the selected gateway will not support the mobile station.

11. The method of claim 6, wherein the re-selection probability vectors are computed as $\rho^{(1)}_i = 0$ $\rho^{(1)}_j = \phi_j + (\phi_j / \Sigma_{k \neq i} \phi_k) \phi_i$ and $\rho^{(n)}_i = 0$ $\rho^{(n)}_j = \rho^{(n-1)}_j + (\rho^{(n-1)}_j / \Sigma_{k \neq i} \rho^{(n-1)}_k) \rho^{(n-1)}_i$, where i is an index of an ASN-GW that will not support the mobile station.

12. A method for gateway operations, the method comprising:
   coordinating with other gateways in a plurality of gateways;
   receiving, by a first one of the plurality of gateways, an allocation request for a mobile station from a base station, the base station selecting the first gateway in accordance with an allocation vector of selection probabilities for the plurality of gateways, wherein the base station is an intermediary between the mobile station and the first gateway;
   determining if the first gateway will accept the allocation request for the mobile station, wherein the determining is based on information shared with the other gateways;
   transmitting a first response message to the base station, wherein the first response message indicates that the first gateway will accept the allocation request for the mobile station, if the first gateway will accept the allocation request for the mobile station; and
   transmitting a second response message to the base station, wherein the second response message indicates an error if the first gateway will not accept the allocation request for the mobile station.

13. The method of claim 12, wherein coordinating with other gateways comprises:
   sending load information and usage information to the other gateways in the plurality of gateways; and
   receiving the load information and usage information from the other gateways in the plurality of gateways.

14. The method of claim 12, wherein the second response message further comprises an indicator of an alternate gateway.

15. The method of claim 14, further comprising transmitting an alternate allocation request for the mobile station to the alternate gateway if the first gateway will not accept the allocation request for the mobile station.

16. The method of claim 14, further comprising selecting the alternate gateway from the other gateways in the plurality of gateways, wherein the selecting is based on load information and usage information coordinated with the other gateways.

17. The method of claim 16, wherein selecting the alternate gateway is based on a selection probability vector generated from the load information and usage information coordinated with the other gateways.

18. The method of claim 12, wherein the controller is configured to determine the allocation vector is by configuring up to N-1 re-selection probability vectors, where N is a number of gateways in the plurality of gateways, and wherein an r-th re-selection probability vector is expressible as $\Pi^{(r)}{}_N = [\rho^r_1 \ldots \rho^r_N]$, where $\rho^r_i$ is a probability that ASN-GW i is selected on an r-th re-selection attempt.

19. A method for gateway operations, the method comprising:
   coordinating with other gateways in a plurality of gateways;
   receiving, by a first one of the plurality of gateways, an allocation request for a mobile station from a base station, the base station selecting the first gateway in accordance with an allocation vector of selection probabilities for the plurality of gateways, wherein the base station is an intermediary between the mobile station and the gateway;
   determining if the first gateway will accept the allocation request for the mobile station, wherein the determining is based on information shared with the other gateways;
   transmitting a first response message to the base station, wherein the first response message indicates that the first gateway will accept the allocation request for the mobile station, if the first gateway will accept the allocation request for the mobile station;
   selecting an alternate gateway; and
   transmitting an alternate allocation request for the mobile station to the alternate gateway if the first gateway will not accept the allocation request for the mobile station.

20. The method of claim 19, wherein selecting an alternate gateway is based on load information and usage information coordinated with the other gateways.

21. The method of claim 19, wherein the allocation vector is determined by configuring up to N-1 re-selection probability vectors, where N is a number of gateways in the plurality of gateways, and wherein an r-th re-selection probability vector is expressible as $$\Pi^{(r)}{}_N = [\rho^r_1 \ldots \rho^r_N],$$

where $\rho^r_i$ is a probability that ASN-GW i is selected on an r-th re-selection attempt.

22. A base station comprising:
a receiver configured to receive requests for initial network entry from a mobile station and response messages;
an initial/network entry unit coupled to the receiver, the initial/network entry unit configured to determine if the mobile station is performing an initial registration or already has an assigned gateway; and
a controller coupled to the receiver, the controller configured to select a first one of a plurality of gateways for the mobile station in accordance with an allocation vector of selection probabilities for the plurality of gateways, to select an alternate gateway for the mobile station, and to configure the allocation vector of selection probabilities for use in selecting the first gateway,
wherein the base station is an intermediary between the mobile station and the first gateway.

23. The base station of claim 22, wherein the controller comprises:
an allocation vector unit configured to configure the allocation vector and at least one re-selection probability vector;
a gateway select unit coupled to the allocation vector unit, the gateway select unit configured to select the first gateway for the mobile station based on the allocation vector; and
a secondary gateway select unit coupled to the allocation vector unit, the secondary gateway select unit configured to select an alternate gateway based on the re-selection probability vector.

24. The base station of claim 23, wherein the allocation vector unit is further configured to update the allocation vector based on gateways selected for mobile stations.

25. The base station of claim 22, wherein the allocation vector is determined by configuring up to N-1 re-selection probability vectors, where N is a number of gateways in the plurality of gateways, and wherein an r-th re-selection probability vector is expressible as $$\Pi^{(r)}{}_N = [\rho^r_1 \ldots \rho^r_N],$$

where $\rho^r_i$ is a probability that ASN-GW i is selected on an r-th re-selection attempt.

* * * * *